US008694043B2

(12) United States Patent
Rácz et al.

(10) Patent No.: US 8,694,043 B2
(45) Date of Patent: Apr. 8, 2014

(54) INTERFERENCE-FREE NEIGHBOR CELL MEASUREMENTS

(75) Inventors: András Rácz, Budapest (HU); László Hévizi, Piliscsaba (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 443 days.

(21) Appl. No.: 12/762,572

(22) Filed: Apr. 19, 2010

(65) Prior Publication Data

US 2011/0256833 A1 Oct. 20, 2011

(51) Int. Cl.
*H04B 7/00* (2006.01)
*H04W 40/00* (2009.01)
*H04L 12/26* (2006.01)

(52) U.S. Cl.
USPC .................. 455/522; 455/449; 370/252

(58) Field of Classification Search
USPC ............ 455/63.1, 67.13, 500, 550.1, 562.1, 455/436, 453, 345, 456.1, 456, 466, 422.1, 455/323, 522; 370/345, 330, 329, 351, 252
See application file for complete search history.

(56) References Cited

U.S. PATENT DOCUMENTS

| | | | |
|---|---|---|---|
| 2004/0095920 A1* | 5/2004 | Lippman et al. ............. | 370/351 |
| 2004/0143428 A1* | 7/2004 | Rappaport et al. ............. | 703/22 |
| 2005/0192015 A1* | 9/2005 | Abusch-Magder et al. .. | 455/446 |
| 2010/0285792 A1* | 11/2010 | Chen et al. ................. | 455/422.1 |
| 2010/0322227 A1* | 12/2010 | Luo ............................. | 370/345 |
| 2010/0330919 A1* | 12/2010 | Gurney et al. ............. | 455/67.11 |
| 2011/0081917 A1* | 4/2011 | Frank et al. ................ | 455/456.1 |
| 2011/0149903 A1* | 6/2011 | Krishnamurthy et al. .... | 370/330 |
| 2011/0199986 A1* | 8/2011 | Fong et al. .................... | 370/329 |
| 2012/0046063 A1* | 2/2012 | Chande et al. ................ | 455/522 |

FOREIGN PATENT DOCUMENTS

| | | |
|---|---|---|
| WO | WO 2007/000721 A2 | 1/2007 |
| WO | WO 2010/129933 A1 | 11/2010 |
| WO | WO 2010/140053 A1 | 12/2010 |

OTHER PUBLICATIONS $3^{rd}$ Generation Partnership Project; Technical Specification Group Radio Access Network; Evolved Universal Terrestrial Radio Access (E-UTRA); Physical Channels and Modulation (Release 9); 3GPP TS 36.211 V9.0.0 (Dec. 2009).

(Continued)

*Primary Examiner* — Andrew Wendell
*Assistant Examiner* — Cindy Trandai
(74) *Attorney, Agent, or Firm* — Myers Bigel Sibley & Sajovec, P.A

(57) ABSTRACT

A device selects one or more cells in the network, and coordinates transmissions from the selected one or more cells, and transmissions from neighbor cells of the selected one or more cells, so that transmissions of the selected one or more cells do not interfere with reference signals transmitted by the neighbor cells at designated times. The device also receives, from a user equipment served by the selected one or more cells, measurement reports associated with the reference signals transmitted by the neighbor cells, and determines signal strengths of the neighbor cells based on the measurement reports. The device further determines, based on the signal strengths, whether network coverage is sufficient when coverage of the selected one or more cells is reduced or when the selected one or more cells are out of service.

30 Claims, 12 Drawing Sheets

(56) References Cited

OTHER PUBLICATIONS

3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9); 3GPP TS 36.300 V9.2.0 (Dec. 2009).

International Search Report, PCT Application No. PCT/SE2011/050270, Sep. 21, 2011.

Written Opinion of the International Searching Authority, PCT Application No. PCT/SE2011/050270, Sep. 21, 2011.

Döttling et al., "Challenges in Mobile Network Operation: Towards Self-Optimizing Networks", IEEE ICASSP 2009: *International Conference on Acoustics, Speech and Signal Processing*, Apr. 19, 2009, pp. 3609-3612.

Feng et al., "Self-Organizing Networks (SON) in 3GPP Long Term Evolution", Nomor Research GmbH, Germany, May 20, 2008, 15 pp.

Wu et al., "Adaptive Cellular Coverage for Radio Resource Management in Mobile Communications", IEEE WiCOM '08: *4$^{th}$ International Conference on Wireless Communications*, Oct. 12, 2008, 4 pp.

\* cited by examiner

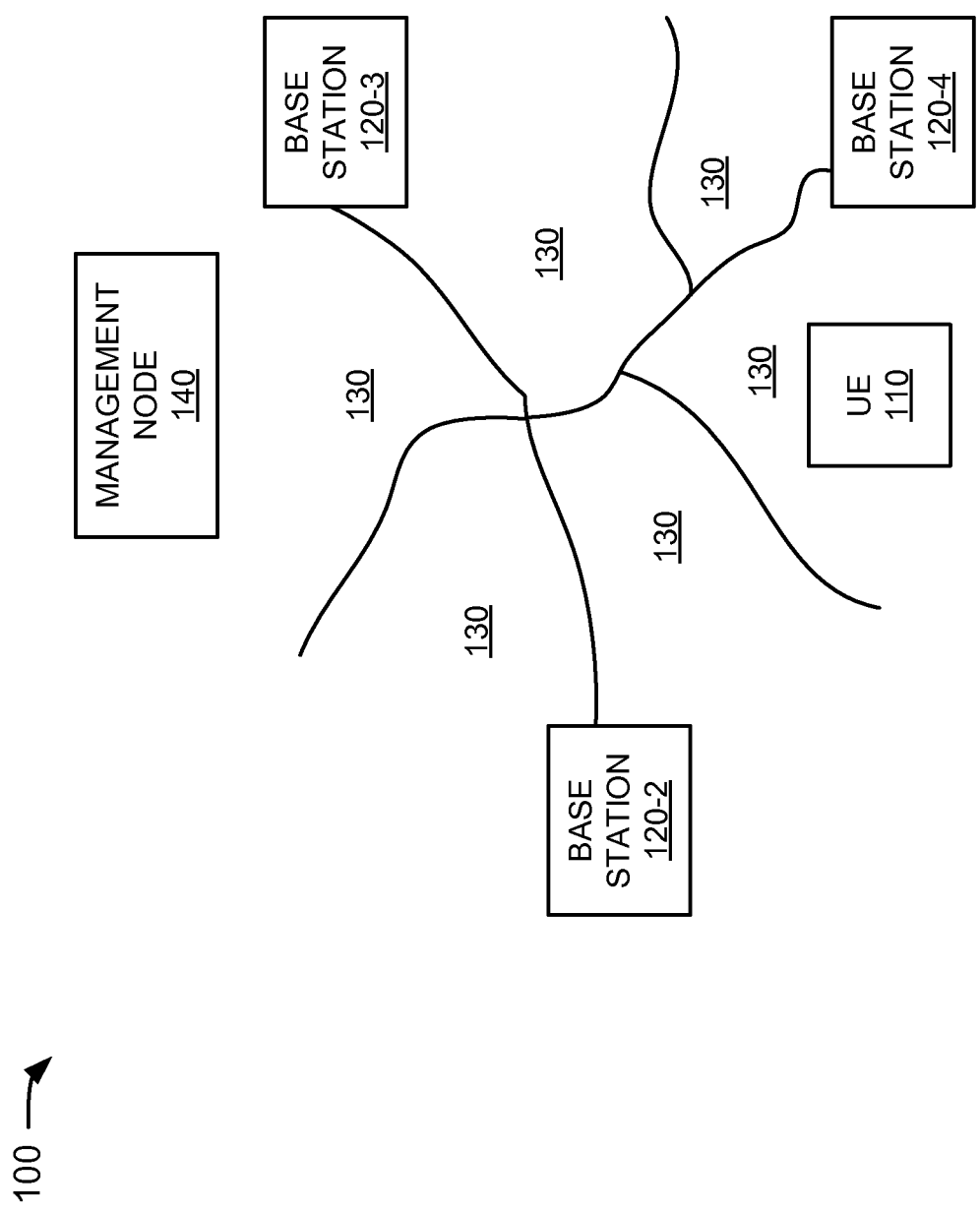

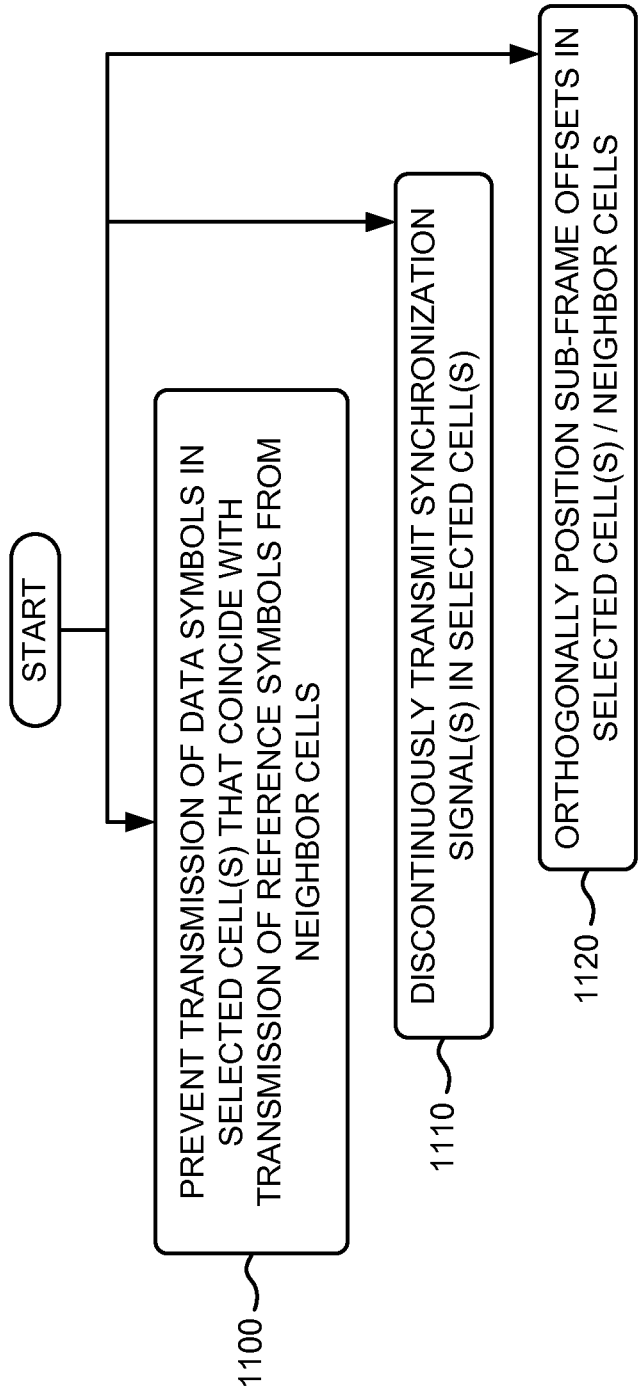

INTERFERENCE-FREE NEIGHBOR CELL MEASUREMENTS

TECHNICAL FIELD

Embodiments described herein relate generally to communication systems, and, more particularly, to providing interference-free cell measurements in a telecommunication system.

BACKGROUND

In order to operate a radio telecommunication network efficiently, the coverage area and service quality of the network have to be continuously monitored and the network configuration should be modified if network performance is inadequate. Before any modifications of the network configuration are deployed, the potential impact of those modifications on network coverage and performance should be assessed.

Typically, any modifications to the network configuration are first evaluated (e.g., with tools such as a TEMS Cell Planner), and then are implemented if approved by the evaluation. An engineering team verifies deployment of the modifications using drive tests, and tunes the modifications if necessary. One example of such network configuration modifications may include turning off some selected cells in the network (e.g., during low traffic hours, such as at night) so that the network coverage is not negatively affected. Before a network operator executes such a modification, he/she may want to verify that network coverage will be maintained even after the selected cells are turned off.

In today's radio networks, one or more systems collect and evaluate network field strength measurements from user equipment (UE) (e.g., mobile communication devices) in order to map coverage and performance capabilities of the network. For example, a Long Term Evolution (LTE)-based network can request UEs to perform reference symbol (RS) measurements periodically and to send the RS measurements to the LTE-based network. The LTE-based network can collect RS measurements, and can associate the collected RS measurements with UE location (e.g., if a mobile positioning subsystem is available).

Newer generations of radio networks are expected to adapt to timely and spatially varying network traffic demand, in a much shorter timescale (e.g., from hour-to-hour) than existing radio networks, and with no or minimal network operator intervention. A network with such features could, for example, concentrate radio resources at hot spots or could turn off unutilized network resources when there is no demand for them.

Since any modification to a correctly operating radio network involves the risk of losing network coverage or degrading network performance, network operators are reluctant to frequently tune network configuration parameters, such as antenna tilt or base station power level. Furthermore, verifying the deployment by drive tests is a tedious and costly task if such network configuration modifications occur frequently. Currently, network operators rely on predictions obtained by repeating a cell planning procedure. However, the cell planning procedure requires human interaction (e.g., making it a slow alternative) and is not applicable to an automatically running self-organizing network (SON) mechanism.

One alternative approach to drive tests includes using existing UE measurements to collect information about network coverage areas and assessing an expected impact of network reconfigurations based on these measurements. One important challenge with this approach, however, is the creation of measurement conditions in an initial network configuration so that the measurement conditions are as similar as possible to hypothetical conditions that would be seen in a reconfigured network. Thus, the creation of measurement conditions for the hypothetical network configuration is important in order to accurately predict the impact of a particular network reconfiguration. More specifically, it is particularly challenging for UEs to take neighbor cell measurements during a high interference situation, especially in a single reuse frequency radio network (e.g., a single-carrier Wavelength Code Division Multiple Access (WCDMA) network or a LTE network). The measurements on weaker signals are inaccurate or impossible to measure if a serving signal is a magnitude larger. This makes it particularly difficult to estimate the hypothetical coverage from a neighbor cell while being in the coverage area of another cell.

SUMMARY

It is an object of the invention to overcome at least some of the above disadvantages, and to provide systems and/or methods for providing interference-free cell measurements in a telecommunication system.

An embodiment described herein may provide a method in a network that includes a device. The method may include selecting, by the device, one or more cells in the network, and coordinating, by the device, transmissions from the selected one or more cells, and transmissions from neighbor cells of the selected one or more cells, so that transmissions of the selected one or more cells do not interfere with reference signals transmitted by the neighbor cells at designated times. The method may also include receiving, by the device and from a user equipment served by the selected one or more cells, measurement reports associated with the reference signals transmitted by the neighbor cell, and determining, by the device, signal strengths of the neighbor cells based on the measurement reports. The method may further include determining, by the device and based on the signal strengths, whether network coverage is sufficient when coverage of the selected one or more cells is reduced or when the selected one or more cells are out of service.

Another embodiment described herein may provide a device in a network. The device may include a memory to store a plurality of instructions, and a processor to execute instructions in the memory to select one or more cells in the network, and coordinate transmissions from the selected one or more cells, and transmissions from neighbor cells of the selected one or more cells, so that transmissions of the selected one or more cells do not interfere with reference signals transmitted by the neighbor cells at designated times. The processor may further execute instructions in the memory to configure a user equipment, served by the selected one or more cells, to measure reference signals transmitted by the neighbor cells at the designated times, where the user equipment generates measurement reports based on the measured reference signals, and receive, from the user equipment, the measurement reports. The processor may also execute instructions in the memory to determine signal strengths of the neighbor cells based on the measurement reports, and determine, based on the signal strengths, whether network coverage is sufficient when coverage of the selected one or more cells is reduced or when the selected one or more cells are out of service.

Still another embodiment described herein may provide a system in a network. The system may include means for selecting one or more cells in the network, and means for coordinating transmissions from the selected one or more cells, and transmissions from neighbor cells of the selected one or more cells, so that transmissions of the selected one or more cells do not interfere with reference signals transmitted by the neighbor cells at designated times. The system may also include means for configuring a user equipment, served by the selected one or more cells, to measure reference signals transmitted by the neighbor cells at the designated times, where the user equipment generates measurement reports based on the measured reference signals, means for receiving, from the user equipment, the measurement reports, and means for configuring the user equipment with measurement windows that coincide with the reference signals transmitted by the neighbor cells at the designated times, where the user equipment measures the reference signals transmitted by the neighbor cells in the measurement windows, and collects the measured reference signals transmitted by the neighbor cells in the measurement windows. The system may further include means for receiving, from the user equipment and separately from other mobility measurement reports, the collected reference signals transmitted by the neighbor cells in the measurement windows, means for determining signal strengths of the neighbor cells based on the measurement reports and based on the collected reference signals transmitted by the neighbor cells in the measurement windows, and means for determining, based on the signal strengths, whether network coverage is sufficient when coverage of the selected one or more cells is reduced or when the selected one or more cells are out of service.

Systems and/or methods described herein may allow user equipment to measure interference-free field strengths from selected cells in a single frequency network while the network operates in a regular mode. The systems and/or methods may assume that cells are aware of frame timing associated with neighbor cells (e.g., assume that the network is synchronized) so that, via close cooperation with neighbor cells, a cell may mute its transmission when UEs attached to the muted cell conduct measurements of the neighbor cells. The systems and/or methods may enable a network to test certain cell configurations without disturbing ongoing traffic in the network cells. In one example, the systems and/or methods may predict what would happen or what the network coverage would be if certain network cells were lowered in power or completely turned off.

The systems and/or methods may permit analysis of configuration changes in an operating network without disturbing continuous operation of the network, and may accurately predict network coverage potential by neighbor cells if a serving cell were turned off or its power level altered. The systems and/or methods may enable UEs to perform measurements without imposing significant overhead on the UEs or on network resources. Such measurements may be part of an automatic optimization process. The systems and/or methods may also be a basis for a centralized SON feature in LTE networks. Such an arrangement may enable a network operator to determine which network cells may be lowered in power or completely turned off (e.g., during non-peak network traffic conditions), which may save reduce network operation expenses as well as demand on network resources.

BRIEF DESCRIPTION OF THE DRAWINGS

FIGS. 1A and 1B are diagrams of an exemplary network in which systems and/or methods described herein may be implemented;

FIGS. 8-11 are flow charts of an exemplary process for providing interference-free cell measurements in a telecommunication system according to embodiments described herein.

DETAILED DESCRIPTION

The following detailed description refers to the accompanying drawings. The same reference numbers in different drawings may identify the same or similar elements. Also, the following detailed description does not limit the invention.

Figure 1A:
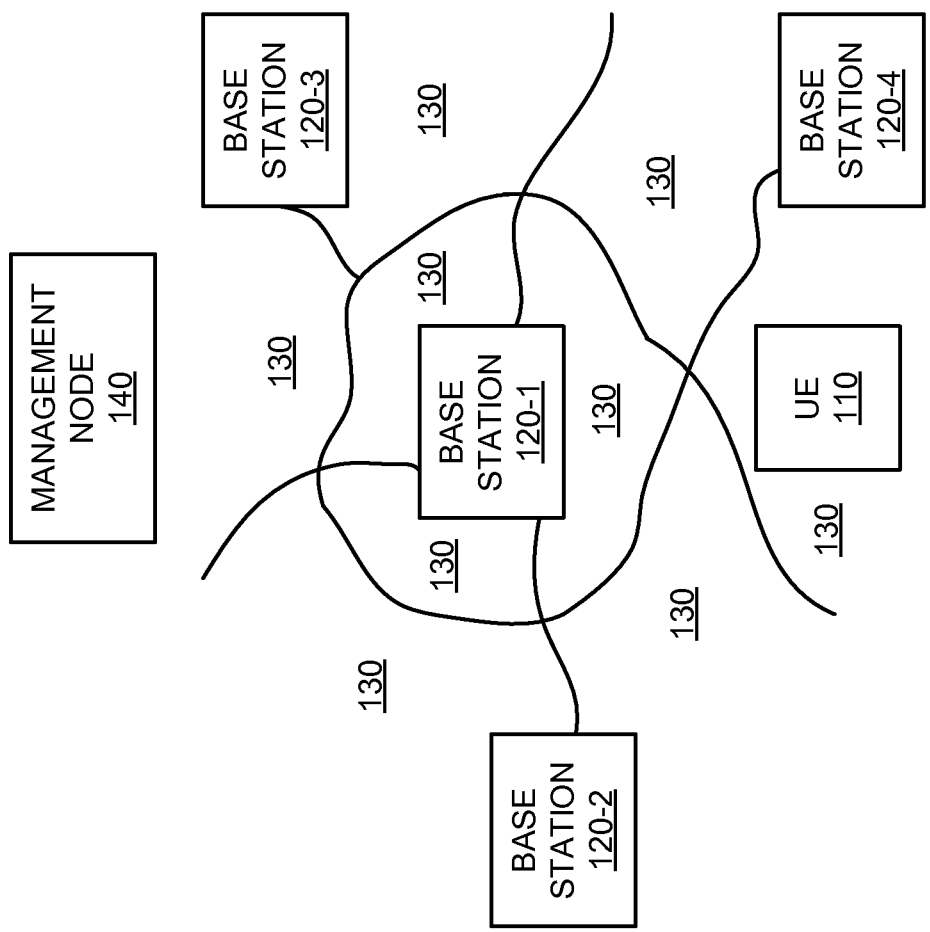

FIGS. 1A and 1B are diagrams of an exemplary network 100 in which systems and/or methods described herein may be implemented. As shown, network 100 may include a UE 110, one or more base stations 120-1 through 120-4 (collectively referred to as "base stations 120" or singularly as "base station 120") forming cells 130, and a management node 140. A single UE 110, multiple base stations 120, and a single management node 140 have been illustrated in FIG. 1 for simplicity. In practice, there may be more UEs 110, base stations 120, and/or management nodes 140. Also, in some instances, one or more of the components of network 100 may perform one or more functions described as being performed by another one or more of the components of network 100. In one embodiment, network 100 may support a multicast-broadcast single frequency network (MBSFN), such as a LTE network or a WCDMA network.

UE 110 may include one or more computation and/or communication devices capable of sending/receiving voice and/or data to/from other UEs 110, base stations 120, and management node 140. UE 110 may include, for example, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a tablet computer, etc.

Base station 120 (also referred to as a NodeB or an eNodeB) may include one or more devices that receive voice and/or data from management node 140 and transmit that voice and/or data to UE 110 via an air interface. Base station 120 may also include one or more devices that receive voice and/or data from UE 110 over an air interface and transmit that voice and/or data to other UEs 110, other base stations 120, and/or management node 140. In one embodiment, each of base stations 120 may form one or more cells 130 (e.g., in network 100) that may provide service to one or more user equipment 110.

Each of cells 130 may include an area of coverage to be supplied with radio service provided by one of base stations 120. Each of cells 130 may include a regular shape (e.g., hexagonal, square, circular, etc.) or an irregular shape. Each cell 130 may be assigned multiple frequencies associated with corresponding base stations 120.

Management node 140 may include one or more devices that control and manage base stations 120. Management node 140 may also perform data processing to manage utilization of radio network services. Management node 140 may support processes such as maintaining network inventory, provisioning services, configuring network components, and/or managing faults. In one embodiment, management node 140 may provide services for network 100, such as order processing, accounting, billing and cost management, network inventory, service provision, network design, network discovery and reconciliation, trouble and fault management, capacity management, network management, field service management, etc. Management node 140 may interconnect with base stations 120 via wired or wireless connections.

In one example, management node 140 may correspond to a radio network controller (RNC). The RNC may transmit/receive voice and data to/from base stations 120, other RNCs, and/or a core network. The RNC may act as a controlling radio network controller (CRNC), a drift radio network controller (DRNC), or a serving radio network controller (SRNC). A CRNC may be responsible for controlling the resources of a base station 120. On the other hand, an SRNC may serve particular UEs 110 and may manage connections towards those UEs 110. Likewise, a DRNC may fulfill a similar role to the SRNC (e.g., may route traffic between a SRNC and a particular UE 110). In other examples, management node 140 may correspond to a operation and support system (OSS), a network management system (NMS), or some other network management entity.

With reference to FIG. 1A, if a serving cell 130 provided by base station 120-1 is turned on, then UEs 110 in the middle of the serving cell 130 (e.g., provided by base station 120-1) may not be able to detect any signals from neighbor cells 130 (e.g., provided by base stations 120-2, 120-3, and/or 120-4) since the signal from the serving cell 130 (e.g., provided by base station 120-1) may be magnitudes larger than and may suppress the weaker signals from the neighbor cells 130. In a LTE network, the interfering signals may include cell-specific reference symbols. The reference symbols of the serving cell 130 may conflict with reference symbols or regular data symbols provided by the neighbor cells 130. In a synchronous network, a serving cell 130 may be aware of reference symbol patterns (e.g., a frequency sub-carrier and time) of its neighbor cells 130, but may not be able to mute transmissions in those patterns under normal operating conditions. UEs 110 associated with a serving cell 130 may be unable to obtain interference-free measurements of reference symbols from neighbor cells 130. Therefore, it may be difficult to predict what the coverage (e.g., provided by neighbor cells 130) would be when the cell 130 (e.g., provided by base station 120-1) serving UEs 110 is turned off, as depicted in FIG. 1B.

Systems and/or methods described herein may enable management node 140 to predict coverage provided by the neighbor cells 130 without actually turning off the serving cell 130 (e.g., provided by base station 120-1). If the predicted coverage provided by the neighbor cells 130 is sufficient (e.g., as determined by management node 140), management node 140 may be able to turn off the serving cell 130 (e.g., provided by base station 120-1) when traffic is low. The systems and/or methods described herein may provide several mechanisms for muting the serving cell 130 (e.g., provided by base station 120-1) so that UEs 110 associated with the serving cell 130 may perform coverage measurements associated with the neighbor cells 130. The mechanisms may differ in the reference signals used for the measurements and in corresponding procedures needed to support the mechanisms.

Although FIGS. 1A and 1B show exemplary components of network 100, in other embodiments, network 100 may include fewer components, different components, differently arranged components, or additional components than depicted in FIGS. 1A and 1B.

Figure 2:
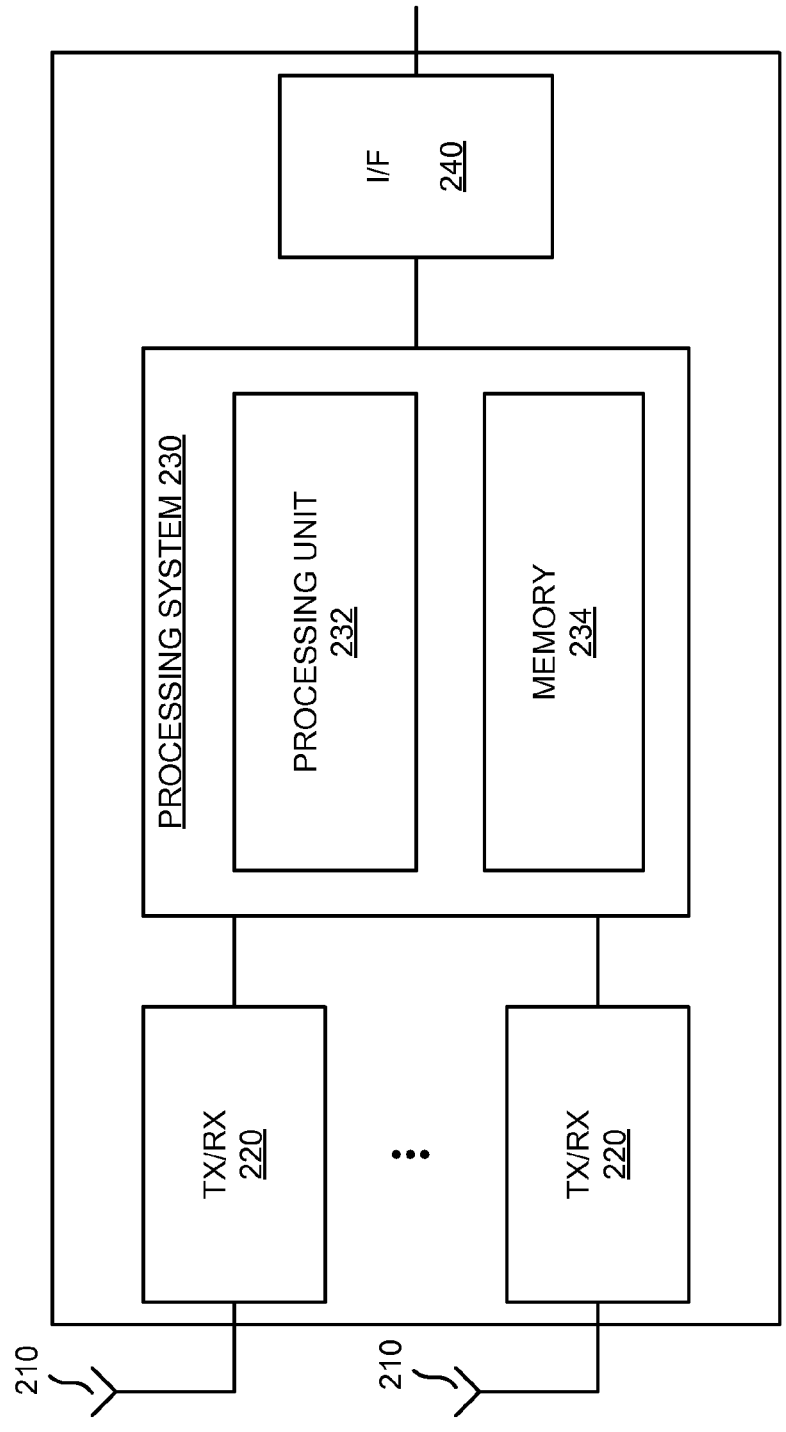
FIG. 2 is a diagram of exemplary components of a base station shown in FIGS. 1A and 1B.

FIG. 2 illustrates a diagram of exemplary components of base station 120. As shown in FIG. 2, base station 120 may include antennas 210, transceivers (TX/RX) 220, a processing system 230, and an interface (I/F) 240.

Antennas 210 may include one or more directional and/or omni-directional antennas. Transceivers 220 may be associated with antennas 210 and may include transceiver circuitry for transmitting and/or receiving symbol sequences in a network, such as network 100, via antennas 210.

Processing system 230 may control the operation of base station 120. Processing system 230 may also process information received via transceivers 220 and/or interface 240. Processing system 230 may further measure quality and strength of a connection, may determine the frame error rate (FER), and may transmit this information to management node 140. As illustrated, processing system 230 may include a processing unit 232 and a memory 234.

Processing unit 232 may include one or more processors, microprocessors, application specific integrated circuits (ASICs), field programmable gate arrays (FPGAs), or the like. Processing unit 232 may process information received via transceivers 220 and/or interface 240. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 232 may transmit control messages and/or data messages, and may cause those control messages and/or data messages to be transmitted via transceivers 220 and/or interface 240. Processing unit 232 may also process control messages and/or data messages received from transceivers 220 and/or interface 240.

Memory 234 may include a random access memory (RAM), a read-only memory (ROM), and/or another type of memory to store data and instructions that may be used by processing unit 232.

Interface 240, for example, may include one or more line cards that allow base station 120 to transmit data to and receive data from another base station 120 and/or management node 140.

As described herein, base station 120 may perform certain operations in response to processing unit 232 executing software instructions of an application contained in a computer-readable medium, such as memory 234. A computer-readable medium may be defined as a physical or logical memory device. A logical memory device may include memory space within a single physical memory device or spread across multiple physical memory devices. The software instructions may be read into memory 234 from another computer-readable medium or from another device via antennas 210 and transceivers 220. The software instructions contained in memory 234 may cause processing unit 232 to perform processes described herein. Alternatively, hardwired circuitry may be used in place of or in combination with software instructions to implement processes described herein. Thus, embodiments described herein are not limited to any specific combination of hardware circuitry and software.

Although FIG. 2 shows exemplary components of base station 120, in other embodiments, base station 120 may contain fewer components, different components, differently arranged components, or additional components than depicted in FIG. 2. In still other embodiments, one or more components of base station 120 may perform one or more other tasks described as being performed by one or more other components of base station 120.

Figure 3:
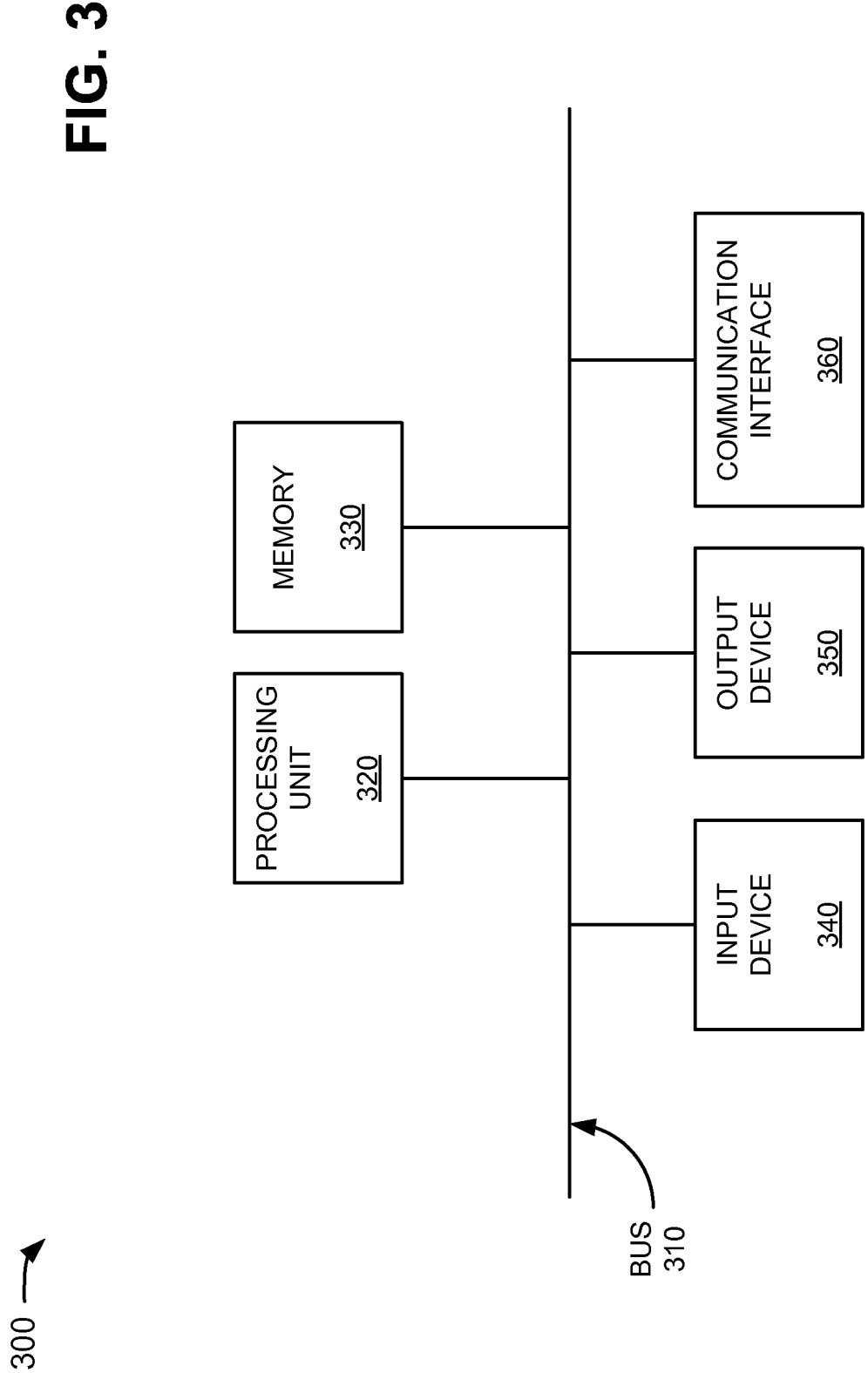
FIG. 3 is a diagram of exemplary components of a user equipment or a management node shown in FIGS. 1A and 1B.

FIG. 3 illustrates a diagram of exemplary components of a device 300 that may correspond to UE 110 and/or management node 140. As shown, device 300 may include a bus 310, a processing unit 320, a memory 330, an input device 340, an output device 350, and a communication interface 360.

Bus 310 may permit communication among the components of device 300. Processing unit 320 may include one or more processors and/or microprocessors that interpret and execute instructions. In some embodiments, processing unit 320 may be implemented as or include one or more ASICs, FPGAs, or the like. Memory 330 may include a RAM or another type of dynamic storage device that stores information and instructions for execution by processing unit 320, a ROM device and/or another type of static storage device that stores static information and instructions for the processing unit 320, a magnetic or optical recording medium and its corresponding drive for storing information and/or instructions, and/or other types of memory.

Input device 340 may include a device that permits an operator to input information to device 300, such as a keyboard, a keypad, a mouse, a pen, a microphone, one or more biometric mechanisms, and the like. Output device 350 may include a device that outputs information to the operator, including a display, a printer, a speaker, etc.

Communication interface 360 may include any transceiver-like mechanism that enables device 300 to communicate with other devices and/or systems. For example, communication interface 360 may include mechanisms for communicating with another device or system via a network.

As described herein, device 300 may perform certain operations in response to processing unit 320 executing software instructions contained in a computer-readable medium, such as main memory 330. The software instructions may be read into memory 330 from another computer-readable medium or from another device via communication interface 360. The software instructions contained in memory 330 may cause processing unit 320 to perform processes that will be described later. Alternatively, hardwired circuitry may be used in place of or in combination with software instructions to implement processes described herein. Thus, systems and/or methods described herein are not limited to any specific combination of hardware circuitry and software.

Although FIG. 3 shows exemplary components of device 300, in other implementations, device 300 may contain fewer components, different components, differently arranged components, or additional components than depicted in FIG. 3. Additionally or alternatively, one or more components of device 300 may perform one or more other tasks described as being performed by one or more other components of device 300.

Figure 4:
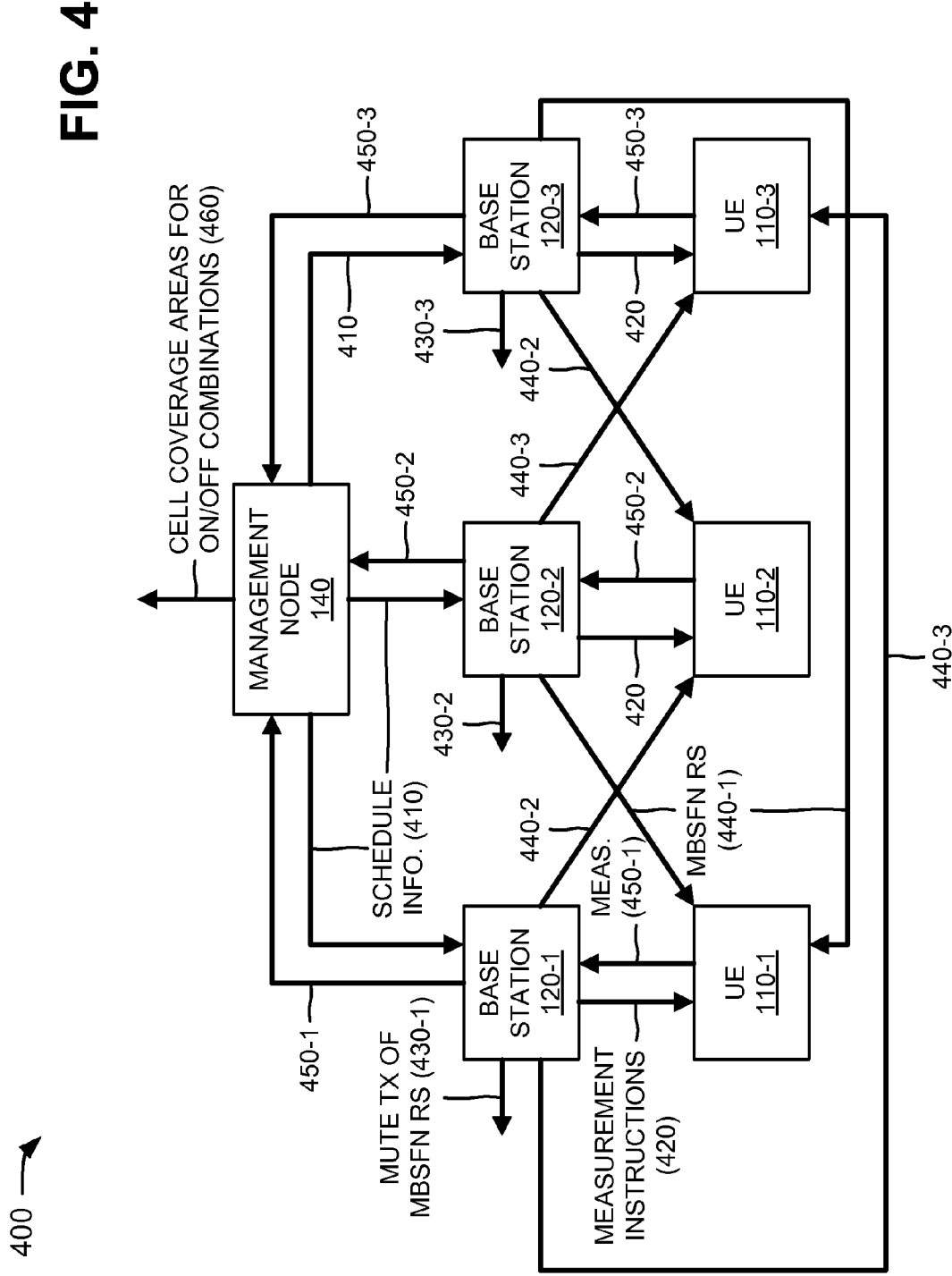
FIG. 4 is a diagram of exemplary interactions among components of an exemplary portion of the network depicted in FIGS. 1A and 1B.

FIG. 4 is a diagram of exemplary interactions among components of an exemplary portion 400 of network 100. As shown, exemplary network portion 400 may include UEs 110-1, 110-2, and 110-3; base stations 120-1, 120-2, and 120-3; and management node 140. UEs 110-1, 110-2, and 110-3; base stations 120-1, 120-2, and 120-3; and management node 140 may include the features described above in connection with one or more of FIGS. 1-3.

In one embodiment, FIG. 4 may depict a mechanism for measuring MBSFN reference symbols so that management node 140 may predict coverage provided by neighbor cells 130 without actually turning off one or more serving cells 130. Management node 140 may configure a MBSFN area (e.g., neighbor cells 130 which are to be measured) and may set up a MBSFN reference symbol muting schedule for the involved cells 130. Management node 140 may provide schedule information 410 (e.g., a MBSFN reference symbol muting schedule) to base stations 120-1, 120-2, and 120-3. Schedule information 410 may include information for configuring base stations 120-1, 120-2, and 120-3 with periodically occurring MBSFN sub-frames. In the MBSFN transmission mode, a group of neighbor cells 130 may act together and may transmit the same signal (e.g., including reference symbols) in a synchronized fashion. In one example, schedule information 410 may provide a data transmission pattern (e.g., for base stations 120-1, 120-2, and 120-3) that specifies when to transmit MBSFN reference symbols (e.g., without MBSFN data transmission) and when to mute transmission of MBSFN reference symbols.

Each of base stations 120-1, 120-2, and 120-3 may receive schedule information 410, and may provide measurement instructions 420 to a corresponding one of UEs 110-1, 110-2, and 110-3 based on schedule information 410. Measurement instructions 420 may instruct UEs 110-1, 110-2, and 110-3 to measure MBSFN reference symbols provided by base stations 120-1, 120-2, and 120-3, and to report the measurements to base stations 120-1, 120-2, and 120-3.

As further shown in FIG. 4, based on schedule information 410, base station 120-1 may mute transmission of MBSFN reference symbols, as indicated by reference number 430-1, and base stations 120-2 and 120-3 may provide MBSFN reference symbols 440-1 to UE 110-1. MBSFN reference symbols 440-1 may be provided in MBSFN sub-frames that are used for measurement purposes (e.g., no actual MBSFN data may be transmitted in these sub-frames). In one embodiment, base stations 120-2 and 120-3 may transmit only MBSFN reference symbols 440-1 within the MBSFN sub-frames. MBSFN reference symbols 440-1 may be located at different parts of the time-frequency space as compared to regular reference symbols, and thus, may be distinguishable to UE 110-1. UE 110-1 may receive a strong, interference-free, highly diversified signal (e.g., MBSFN reference symbols 440-1) from base stations 120-2 and 120-3.

Based on schedule information 410, base station 120-2 may mute transmission of MBSFN reference symbols, as indicated by reference number 430-2, and base stations 120-1 and 120-3 may provide MBSFN reference symbols 440-2 to UE 110-2. MBSFN reference symbols 440-2 may include the features described above in connection with MBSFN reference symbols 440-1. In one embodiment, base stations 120-1 and 120-3 may transmit only MBSFN reference symbols 440-2 within MBSFN sub-frames. UE 110-1 may receive a strong, interference-free, highly diversified signal (e.g., MBSFN reference symbols 440-2) from base stations 120-1 and 120-3.

Based on schedule information 410, base station 120-3 may mute transmission of MBSFN reference symbols, as indicated by reference number 430-3, and base stations 120-1 and 120-2 may provide MBSFN reference symbols 440-3 to UE 110-3. MBSFN reference symbols 440-3 may include the features described above in connection with MBSFN reference symbols 440-1. In one embodiment, base stations 120-1 and 120-2 may transmit only MBSFN reference symbols 440-3 within MBSFN sub-frames. UE 110-1 may receive a strong, interference-free, highly diversified signal (e.g., MBSFN reference symbols 440-3) from base stations 120-1 and 120-2.

In one embodiment, each of base stations 120-1, 120-2, and 120-3 may transmit MBSFN reference symbols 440 at different times (e.g., in a MBSFN sub-frame). This may be achieved, for example, by configuring a separate MBSFN network (e.g., with non-colliding MBSFN sub-frames) for each of base stations 120-1, 120-2, and 120-3. In another example, this may be achieved by grouping neighboring base stations 120-1, 120-2, and 120-3 and configuring the group as one MBSFN area (e.g., by coordinating which of base stations 120-1, 120-2, or 120-3 is to transmit in a particular MBSFN sub-frame while the other of base stations 120-1, 120-2, and 120-3 mute their transmissions). By changing a pattern of base stations 120-1, 120-2, and 120-3 that are scheduled to mute their transmissions of MBSFN sub-frames, UEs 110-1, 110-2, and 110-3 may make interference-free link quality measurements from selected cells (e.g., provided by base stations 120-1, 120-2, and 120-3). In one example, a serving cell (e.g., provided by one of base stations 120-1, 120-2, or 120-3) may not schedule user data transmissions in sub-frames where UEs 110-1, 110-2, and 110-3 are to measure neighbor cell MBSFN reference symbols.

Based on measurement instructions 420, UE 110-1 may measure MBSFN reference symbols 440-1, and may report the measured MBSFN reference symbols 440-1 (e.g., as measurements 450-1) to base station 120-1. Base station 120-1 may provide measurements 450-1 to management node 140. Based on measurement instructions 420, UE 110-2 may measure MBSFN reference symbols 440-2, and may report the measured MBSFN reference symbols 440-2 (e.g., as measurements 450-2) to base station 120-2. Base station 120-2 may provide measurements 450-2 to management node 140. Based on measurement instructions 420, UE 110-3 may measure MBSFN reference symbols 440-3, and may report the measured MBSFN reference symbols 440-3 (e.g., as measurements 450-3) to base station 120-3. Base station 120-3 may provide measurements 450-3 to management node 140.

Management node 140 may receive measurements 450-1, 450-2, and 450-3, and may determine if measurements 450-1, 450-2, and 450-3 provide a sufficient number of measurements for reliable statistics. When management node 140 determines that a sufficient number of measurements for reliable statistics have been collected, management node 140 may determine potential cell coverage areas for various on/off combinations of cells, as indicated by reference number 460. For example, management node 140 may determine signal strengths of neighbor cells (e.g., provided by one or more of base stations 120-1, 120-2, and 120-3) based on measurements 450-1, 450-2, and 450-3, and may determine whether network coverage would be sufficiently provided by the neighbor cells if one of base stations 120-1, 120-2, or 120-3 were turned off or lowered in power.

Although FIG. 4 shows exemplary components of network portion 400, in other embodiments, network portion 400 may contain fewer components, different components, differently arranged components, or additional components than depicted in FIG. 4. Additionally or alternatively, one or more components of network portion 400 may perform one or more other tasks described as being performed by one or more other components of network portion 400.

Figure 5:
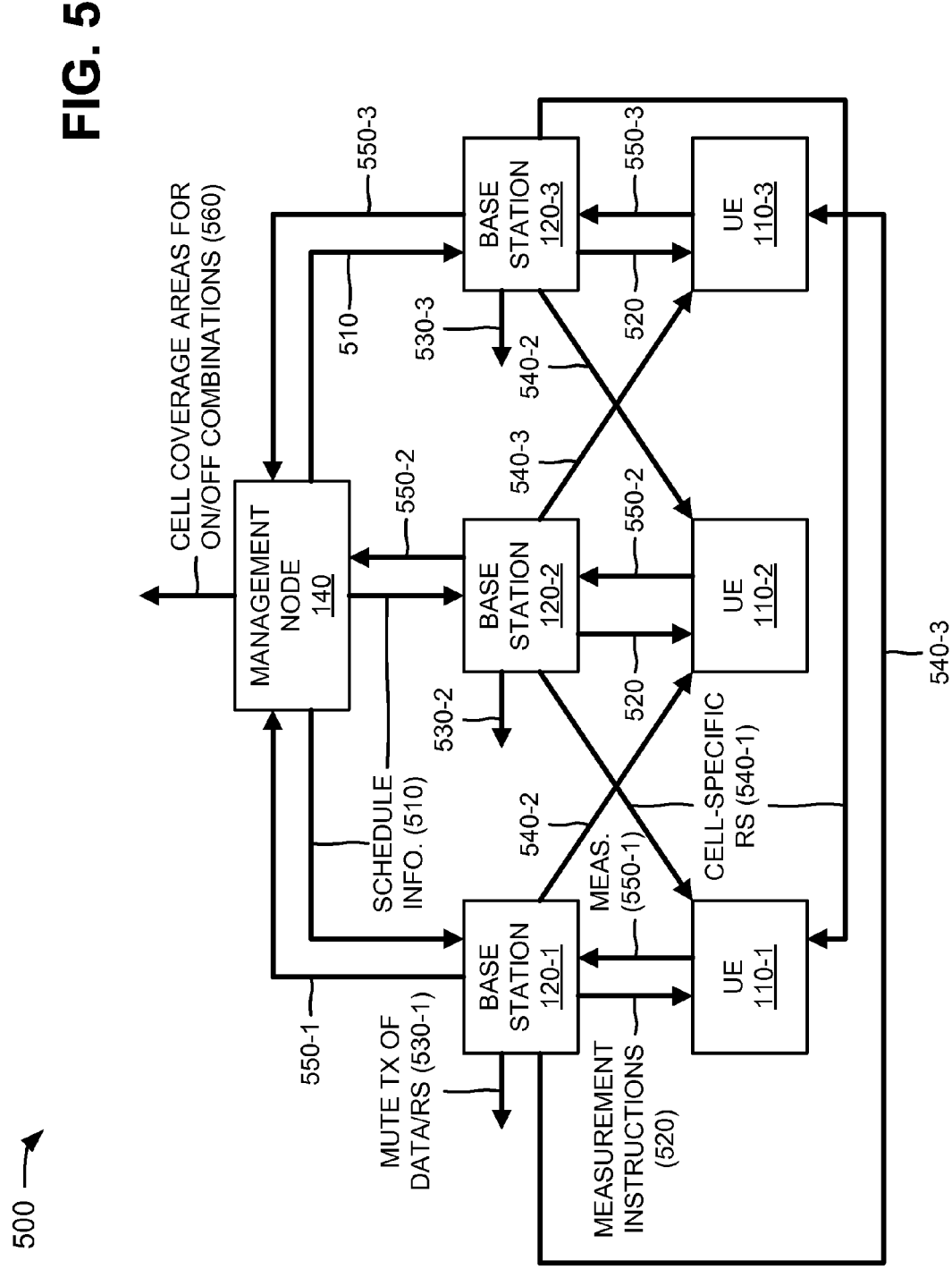
FIG. 5 is a diagram of further exemplary interactions among components of an exemplary portion of the network depicted in FIGS. 1A and 1B.

FIG. 5 is a diagram of further exemplary interactions among components of an exemplary portion 500 of network 500. As shown, exemplary network portion 500 may include UEs 110-1, 110-2, and 110-3; base stations 120-1, 120-2, and 120-3; and management node 140. UEs 110-1, 110-2, and 110-3; base stations 120-1, 120-2, and 120-3; and management node 140 may include the features described above in connection with one or more of FIGS. 1-3.

In one embodiment, FIG. 5 may depict a mechanism for measuring regular reference symbols so that management node 140 may predict coverage provided by neighbor cells 130 without actually turning off one or more serving cells 130. Management node 140 may configure an area (e.g., neighbor cells 130 which are to be measured) and may set up a regular reference symbol muting schedule for the involved cells 130. Management node 140 may provide schedule information 510 (e.g., a regular reference symbol muting schedule) to base stations 120-1, 120-2, and 120-3. In one example, schedule information 510 may include information for configuring base stations 120-1, 120-2, and 120-3 to mute (e.g., in turn) the transmission of both data symbols and reference symbols. In another example, schedule information 510 may include information for configuring base stations 120-1, 120-2, and 120-3 to mute (e.g., in turn) the transmission of data symbols.

The sub-frames designated for muting may be configured as MBSFN sub-frames in the serving cell (e.g., in one of base stations 120-1, 120-2, or 120-3). This means that the serving cell may be configured with periodically occurring MBSFN sub-frames. The MBSFN sub-frames may be used to enable UEs 110-1, 110-2, and 110-3 to make interference-free neighbor cell measurements. Actual MBSFN data, MBSFN reference symbols, and regular reference symbols may not be transmitted in the MBSFN sub-frames. This approach may be used in network configurations where transmission of reference symbols of neighbor cells are non-orthogonal and suffer constant collisions (e.g., such as occurs in synchronized networks).

If only data symbols are to be muted, the serving cell may mute transmission of data symbols that would coincide with reference symbols transmitted from neighbor cells, but may transmit reference symbols. In one example, the serving cell may mute transmission of all data symbols provided in designated sub-frames. In another example, the serving cell may mute transmission of only those data symbols (e.g., provided in the designated sub-frames) that would collide with reference symbols provided by the neighbor cells. The designated sub-frames need not be MBSFN sub-frames. This approach may be used in network configurations where cells transmit their reference symbols in a collision-free and orthogonal manner.

As further shown in FIG. 5, each of base stations 120-1, 120-2, and 120-3 may receive schedule information 510, and may provide measurement instructions 520 to a corresponding one of UEs 110-1, 110-2, and 110-3 based on schedule information 510. Measurement instructions 520 may instruct UEs 110-1, 110-2, and 110-3 to measure reference symbols provided by base stations 120-1, 120-2, and 120-3, and to report the measurements to base stations 120-1, 120-2, and 120-3.

Based on schedule information 510, base station 120-1 may mute transmission of data symbols and reference symbols (or just data symbols), as indicated by reference number 530-1, and base stations 120-2 and 120-3 may provide cell-specific reference symbols 540-1 to UE 110-1. Sub-frames that are used to measure cell-specific reference symbols 540-1 may be designated as MBSFN sub-frames at base station 120-1. UE 110-1 may receive a strong, interference-free, highly diversified signal (e.g., cell-specific reference symbols 540-1) from base stations 120-2 and 120-3.

Based on schedule information 510, base station 120-2 may mute transmission of data symbols and reference symbols (or just data symbols), as indicated by reference number 530-2, and base stations 120-1 and 120-3 may provide cell-specific reference symbols 540-2 to UE 110-2. Cell-specific reference symbols 540-2 may include the features described above in connection with cell-specific reference symbols

540-1. UE 110-1 may receive a strong, interference-free, highly diversified signal (e.g., cell-specific reference symbols 540-2) from base stations 120-1 and 120-3.

Based on schedule information 510, base station 120-3 may mute transmission of data symbols and reference symbols (or just data symbols), as indicated by reference number 530-3, and base stations 120-1 and 120-2 may provide cell-specific reference symbols 540-3 to UE 110-2. Cell-specific reference symbols 540-3 may include the features described above in connection with cell-specific reference symbols 540-1. UE 110-1 may receive a strong, interference-free, highly diversified signal (e.g., cell-specific reference symbols 540-3) from base stations 120-1 and 120-2.

Based on measurement instructions 520, UE 110-1 may measure cell-specific reference symbols 540-1, and may report the measured cell-specific reference symbols 540-1 (e.g., as measurements 550-1) to base station 120-1. Base station 120-1 may provide measurements 550-1 to management node 140. Based on measurement instructions 520, UE 110-2 may measure cell-specific reference symbols 540-2, and may report the measured cell-specific reference symbols 540-2 (e.g., as measurements 550-2) to base station 120-2. Base station 120-2 may provide measurements 550-2 to management node 140. Based on measurement instructions 520, UE 110-3 may measure cell-specific reference symbols 540-3, and may report the measured cell-specific reference symbols 540-3 (e.g., as measurements 550-3) to base station 120-3. Base station 120-3 may provide measurements 550-3 to management node 140.

Management node 140 may receive measurements 550-1, 550-2, and 550-3, and may determine if measurements 550-1, 550-2, and 550-3 provide a sufficient number of measurements for reliable statistics. When management node 140 determines that a sufficient number of measurements for reliable statistics have been collected, management node 140 may determine potential cell coverage areas for various on/off combinations of cells, as indicated by reference number 560. For example, management node 140 may determine signal strengths of neighbor cells (e.g., provided by one or more of base stations 120-1, 120-2, and 120-3) based on measurements 550-1, 550-2, and 550-3, and may determine whether network coverage would be sufficiently provided by the neighbor cells if one of base stations 120-1, 120-2, or 120-3 were turned off or lowered in power.

Although FIG. 5 shows exemplary components of network portion 500, in other embodiments, network portion 500 may contain fewer components, different components, differently arranged components, or additional components than depicted in FIG. 5. Additionally or alternatively, one or more components of network portion 500 may perform one or more other tasks described as being performed by one or more other components of network portion 500.

Figure 6:
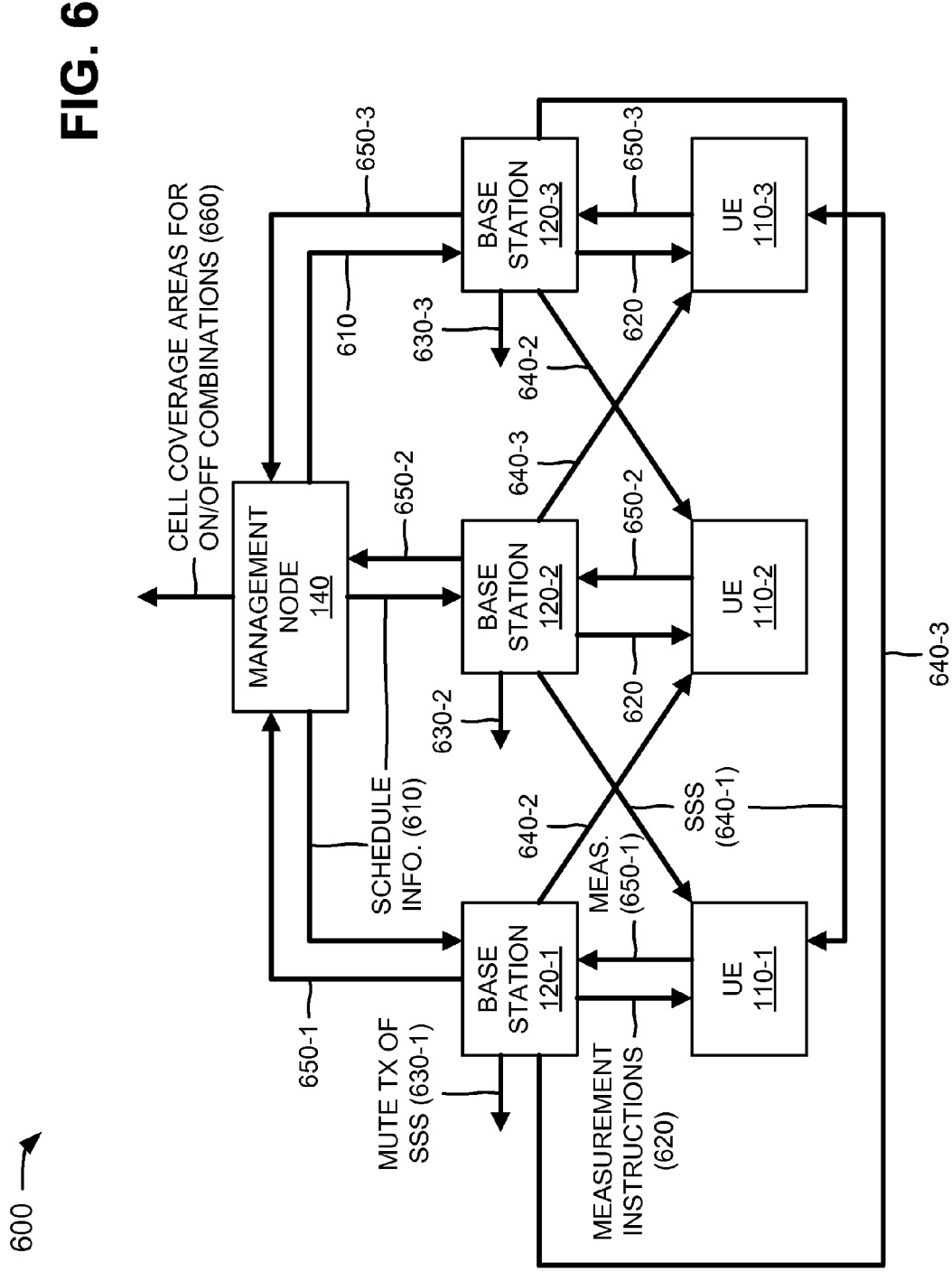
FIG. 6 is a diagram of still further exemplary interactions among components of an exemplary portion of the network depicted in FIGS. 1A and 1B.

FIG. 6 is a diagram of still further exemplary interactions among components of an exemplary portion 600 of network 100. As shown, exemplary network portion 600 may include UEs 110-1, 110-2, and 110-3; base stations 120-1, 120-2, and 120-3; and management node 140. UEs 110-1, 110-2, and 110-3; base stations 120-1, 120-2, and 120-3; and management node 140 may include the features described above in connection with one or more of FIGS. 1-3.

In one embodiment, FIG. 6 may depict a mechanism for measuring a secondary synchronization signal (SSS) (or secondary synchronization channel (S-SCH)) so that management node 140 may predict coverage provided by neighbor cells 130 without actually turning off one or more serving cells 130. Management node 140 may configure an area (e.g., neighbor cells 130 which are to be measured) and may set up a SSS muting schedule for the involved cells 130. Management node 140 may provide schedule information 610 (e.g., a SSS muting schedule) to base stations 120-1, 120-2, and 120-3. In one example, schedule information 610 may include information for configuring base stations 120-1, 120-2, and 120-3 to mute (e.g., in turn) the transmission of SSSs.

The SSS may be transmitted at the same time from all cells in a synchronous network, but there may be one-hundred and sixty-eight (168) different forms of the SSS depending on physical cell identity. The SSS from one cell may suppress a weaker SSS from a neighbor cell so that an interference-free coverage area of a cell may not be directly deduced. Though the SSS is a part of the physical layer, muting the SSS for short periods of time may not disturb ongoing activity in a serving cell. In one example, the time period for muting the SSS (e.g., in a serving cell) may be just long enough to evaluate the SSS based on link quality from neighbor cells.

As further shown in FIG. 6, each of base stations 120-1, 120-2, and 120-3 may receive schedule information 610, and may provide measurement instructions 620 to a corresponding one of UEs 110-1, 110-2, and 110-3 based on schedule information 610. Measurement instructions 620 may instruct UEs 110-1, 110-2, and 110-3 to measure SSSs provided by base stations 120-1, 120-2, and 120-3, and to report the measurements to base stations 120-1, 120-2, and 120-3.

Based on schedule information 610, base station 120-1 may mute transmission of a SSS, as indicated by reference number 630-1, and base stations 120-2 and 120-3 may provide SSSs 640-1 to UE 110-1. UE 110-1 may be instructed (e.g., by measurement instructions 620) to receive SSSs 640-1 based on link quality measurements of base stations seen by UE 110-1 (e.g., base stations 120-2 and 120-3). Thus, UE 110-1 may receive strong, interference-free, highly diversified signals (e.g., SSSs 640-1) from base stations 120-2 and 120-3.

Based on schedule information 610, base station 120-2 may mute transmission of a SSS, as indicated by reference number 630-2, and base stations 120-1 and 120-3 may provide SSSs 640-2 to UE 110-2. UE 110-2 may be instructed (e.g., by measurement instructions 620) to receive SSSs 640-2 based on link quality measurements of base stations seen by UE 110-2 (e.g., base stations 120-1 and 120-3). Thus, UE 110-2 may receive strong, interference-free, highly diversified signals (e.g., SSSs 640-2) from base stations 120-1 and 120-3.

Based on schedule information 610, base station 120-3 may mute transmission of a SSS, as indicated by reference number 630-3, and base stations 120-1 and 120-2 may provide SSSs 640-3 to UE 110-3. UE 110-3 may be instructed (e.g., by measurement instructions 620) to receive SSSs 640-3 based on link quality measurements of base stations seen by UE 110-3 (e.g., base stations 120-1 and 120-2). Thus, UE 110-3 may receive strong, interference-free, highly diversified signals (e.g., SSSs 640-3) from base stations 120-1 and 120-2.

Based on measurement instructions 620, UE 110-1 may measure SSSs 640-1, and may report the measured SSSs 640-1 (e.g., as measurements 650-1) to base station 120-1. Base station 120-1 may provide measurements 650-1 to management node 140. Based on measurement instructions 620, UE 110-2 may measure SSSs 640-2, and may report the measured SSSs 640-2 (e.g., as measurements 650-2) to base station 120-2. Base station 120-2 may provide measurements 650-2 to management node 140. Based on measurement instructions 620, UE 110-3 may measure SSSs 640-3, and may report the measured SSSs 640-3 (e.g., as measurements 650-3) to base station 120-3. Base station 120-3 may provide measurements 650-3 to management node 140.

Management node 140 may receive measurements 650-1, 650-2, and 650-3, and may determine if measurements 650-1, 650-2, and 650-3 provide a sufficient number of measurements for reliable statistics. When management node 140 determines that a sufficient number of measurements for reliable statistics have been collected, management node 140 may determine potential cell coverage areas for various on/off combinations of cells, as indicated by reference number 660. For example, management node 140 may determine signal strengths of neighbor cells (e.g., provided by one or more of base stations 120-1, 120-2, and 120-3) based on measurements 650-1, 650-2, and 650-3, and may determine whether network coverage would be sufficiently provided by the neighbor cells if one of base stations 120-1, 120-2, or 120-3 were turned off or lowered in power.

Although FIG. 6 shows exemplary components of network portion 600, in other embodiments, network portion 600 may contain fewer components, different components, differently arranged components, or additional components than depicted in FIG. 6. Additionally or alternatively, one or more components of network portion 600 may perform one or more other tasks described as being performed by one or more other components of network portion 600.

Figure 7:
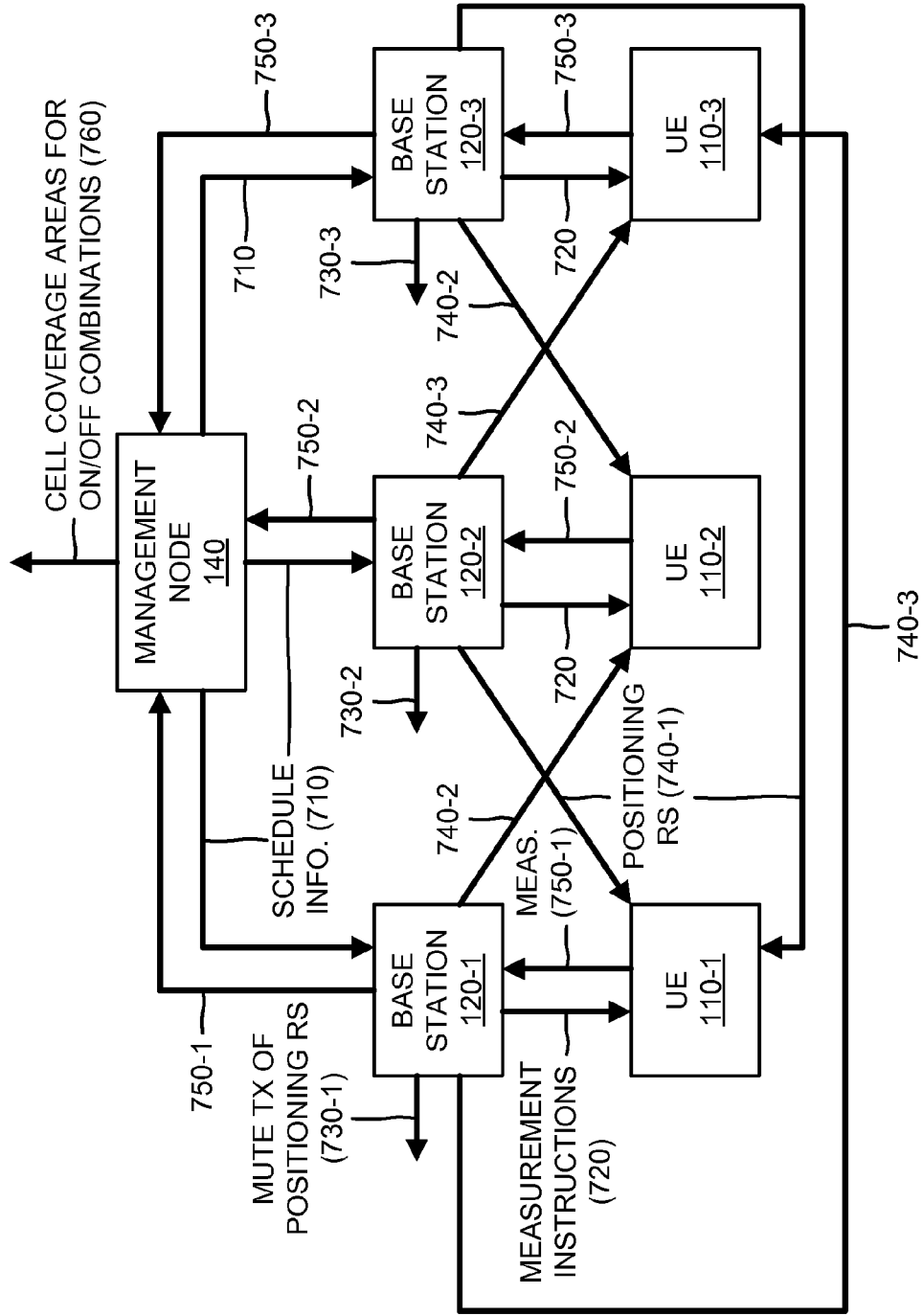
FIG. 7 is a diagram of additional exemplary interactions among components of an exemplary portion of the network depicted in FIGS. 1A and 1B.

FIG. 7 is a diagram of additional exemplary interactions among components of an exemplary portion 700 of network 100. As shown, exemplary network portion 700 may include UEs 110-1, 110-2, and 110-3; base stations 120-1, 120-2, and 120-3; and management node 140. UEs 110-1, 110-2, and 110-3; base stations 120-1, 120-2, and 120-3; and management node 140 may include the features described above in connection with one or more of FIGS. 1-3.

In one embodiment, FIG. 7 may depict a mechanism for measuring positioning reference signals so that management node 140 may predict coverage provided by neighbor cells 130 without actually turning off one or more serving cells 130. In this embodiment, muting may be optional since positioning reference signals will not interfere with each other if cells are correctly configured with positioning signal offsets. Management node 140 may configure an area (e.g., neighbor cells 130 which are to be measured) and may configure the positioning reference signals for the involved cells 130. Management node 140 may provide schedule information 710 (e.g., a positioning reference signal muting schedule) to base stations 120-1, 120-2, and 120-3. In one example, schedule information 710 may include information for configuring base stations 120-1, 120-2, and 120-3 to mute (e.g., in turn) the transmission of positioning reference signals.

Positioning reference signals may enable UEs 110-1, 110-2, and 110-3 to accurately measure radio wave propagation time from neighbor cells. With coordination of cell-specific sub-frame periods and offsets for the positioning reference symbols, interference-free measurement of positioning reference signals is possible.

As further shown in FIG. 7, each of base stations 120-1, 120-2, and 120-3 may receive schedule information 710, and may provide measurement instructions 720 to a corresponding one of UEs 110-1, 110-2, and 110-3 based on schedule information 710. Measurement instructions 720 may instruct UEs 110-1, 110-2, and 110-3 to measure positioning reference signals provided by base stations 120-1, 120-2, and 120-3, and to report the measurements to base stations 120-1, 120-2, and 120-3.

Based on schedule information 710, base station 120-1 may (optionally) mute transmission of a positioning reference signal, as indicated by reference number 730-1, and base stations 120-2 and 120-3 may provide positioning reference signals 740-1 to UE 110-1. UE 110-1 may receive strong, interference-free, highly diversified signals (e.g., positioning reference signals 740-1) from base stations 120-2 and 120-3.

Based on schedule information 710, base station 120-2 may (optionally) mute transmission of a positioning reference signal, as indicated by reference number 730-2, and base stations 120-1 and 120-3 may provide positioning reference signals 740-2 to UE 110-2. UE 110-2 may receive strong, interference-free, highly diversified signals (e.g., positioning reference signals 740-2) from base stations 120-1 and 120-3.

Based on schedule information 710, base station 120-3 may (optionally) mute transmission of a positioning reference signal, as indicated by reference number 730-3, and base stations 120-1 and 120-2 may provide positioning reference signals 740-3 to UE 110-3. UE 110-3 may receive strong, interference-free, highly diversified signals (e.g., positioning reference signals 740-3) from base stations 120-1 and 120-2.

Based on measurement instructions 720, UE 110-1 may measure positioning reference signals 740-1, and may report the measured positioning reference signals 740-1 (e.g., as measurements 750-1) to base station 120-1. Base station 120-1 may provide measurements 750-1 to management node 140. Based on measurement instructions 720, UE 110-2 may measure positioning reference signals 740-2, and may report the measured positioning reference signals 740-2 (e.g., as measurements 750-2) to base station 120-2. Base station 120-2 may provide measurements 750-2 to management node 140. Based on measurement instructions 720, UE 110-3 may measure positioning reference signals 740-3, and may report the measured positioning reference signals 740-3 (e.g., as measurements 750-3) to base station 120-3. Base station 120-3 may provide measurements 750-3 to management node 140.

Management node 140 may receive measurements 750-1, 750-2, and 750-3, and may determine if measurements 750-1, 750-2, and 750-3 provide a sufficient number of measurements for reliable statistics. When management node 140 determines that a sufficient number of measurements for reliable statistics have been collected, management node 140 may determine potential cell coverage areas for various on/off combinations of cells, as indicated by reference number 760. For example, management node 140 may determine signal strengths of neighbor cells (e.g., provided by one or more of base stations 120-1, 120-2, and 120-3) based on measurements 750-1, 750-2, and 750-3, and may determine whether network coverage would be sufficiently provided by the neighbor cells if one of base stations 120-1, 120-2, or 120-3 were turned off or lowered in power.

Although FIG. 7 shows exemplary components of network portion 700, in other embodiments, network portion 700 may contain fewer components, different components, differently arranged components, or additional components than depicted in FIG. 7. Additionally or alternatively, one or more components of network portion 700 may perform one or more other tasks described as being performed by one or more other components of network portion 700.

In one embodiment, UEs 110 may perform the measurements described above in connection with FIGS. 4-7, and may report the measurement results according to a reporting criteria configured by higher layers (e.g., configured by a radio resource control (RRC) protocol). A measurement configuration and reporting criteria associated with UEs 110 may be augmented with an additional option to specify a gap pattern (e.g., a measurement window) for UEs 110 when UEs 110 perform interference-free neighbor cell measurements. The measurement window configured at UE 110-1 may coincide with a muting schedule of base station 120-1 serving UE 110-1. In one example, reference symbol measurement samples (e.g., received by UEs 110 in sub-frames) may be designated by the measurement window for interference-free neighbor cell measurement, and may be collected, filtered, and reported separately from reference symbol measurements received in other sub-frames. A serving cell may send a RRC Measurement Configuration message (e.g., to UEs 110) specifying the gap pattern for interference-free neighbor cell reference symbol measurements together with measurement filtering parameters and reporting criteria.

FIGS. 8-11 are flow charts of an exemplary process 800 for providing interference-free cell measurements in a telecommunication system according to embodiments described herein. In one embodiment, process 800 may be performed by management node 140. In other embodiments, some or all of process 800 may be performed by another device or group of devices (e.g., communicating with management node 140).

Figure 8:
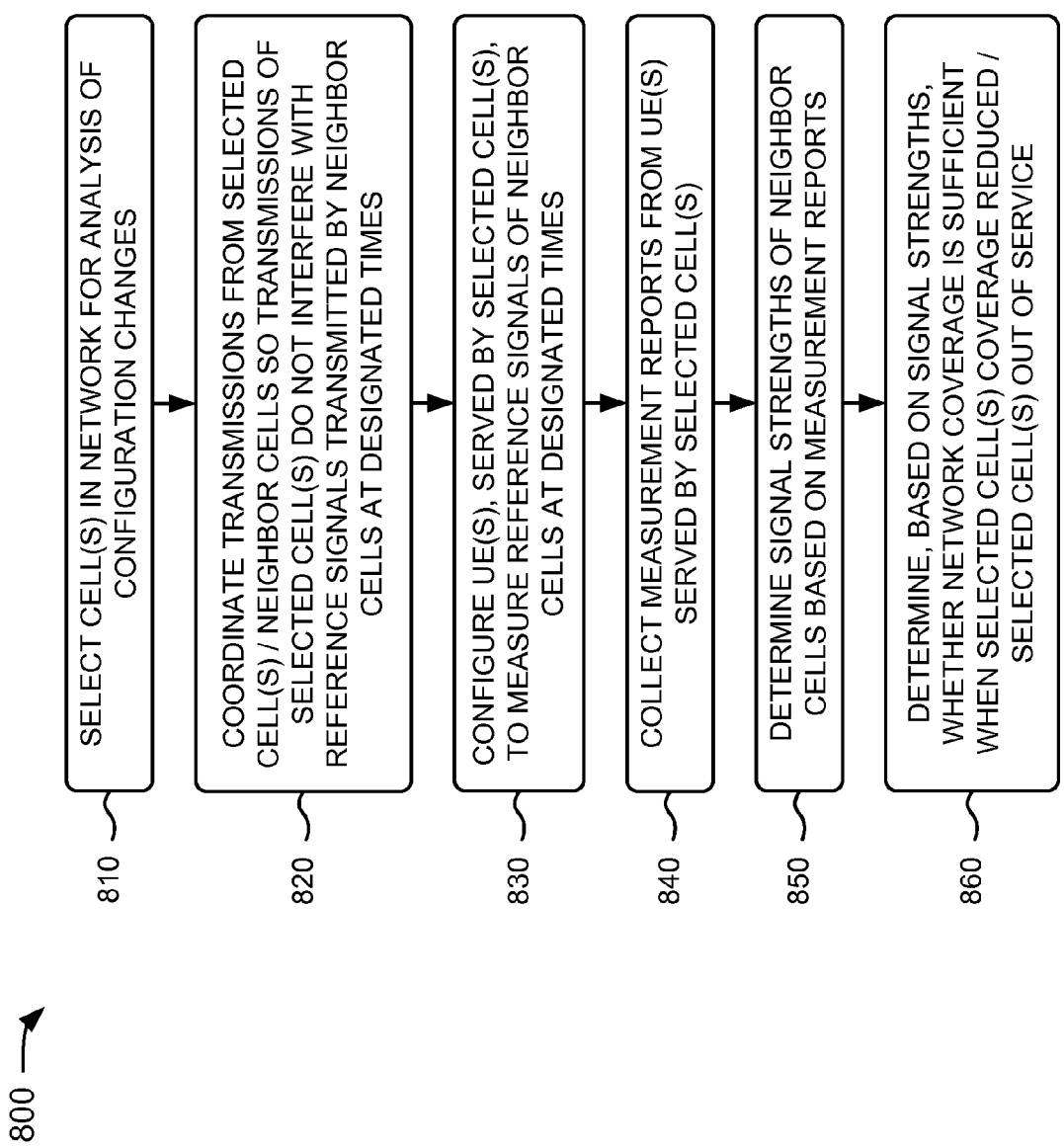

As illustrated in FIG. 8, process 800 may include selecting one or more cells in a network for analysis of configuration changes (block 810), and coordinating transmissions from the selected cell(s) and neighbor cells so that transmissions of the selected cell(s) do not interfere with reference signals transmitted by neighbor cells at designated times (block 820). For example, in embodiments described above in connection with FIG. 4, management node 140 may configure a MBSFN area (e.g., neighbor cells 130 which are to be measured) and may set up a MBSFN reference symbol muting schedule for the involved cells 130. Management node 140 may provide schedule information 410 (e.g., a MBSFN reference symbol muting schedule) to base stations 120-1, 120-2, and 120-3. Schedule information 410 may include information for configuring base stations 120-1, 120-2, and 120-3 with periodically occurring MBSFN sub-frames. In one example, schedule information 410 may provide a data transmission pattern (e.g., for base stations 120-1, 120-2, and 120-3) that specifies when to transmit MBSFN reference symbols (e.g., without MBSFN data transmission) and when to mute transmission of MBSFN reference symbols.

As further shown in FIG. 8, process 800 may include configuring one or more UEs, served by the selected cell(s), to measure reference signals of the neighbor cells at designated times (block 830), and collecting measurement reports from the UE(s) served by the selected cell(s) (block 840). For example, in embodiments described above in connection with FIG. 4, each of base stations 120-1, 120-2, and 120-3 may receive schedule information 410, and may provide measurement instructions 420 to a corresponding one of UEs 110-1, 110-2, and 110-3 based on schedule information 410. Measurement instructions 420 may instruct UEs 110-1, 110-2, and 110-3 to measure MBSFN reference symbols provided by base stations 120-1, 120-2, and 120-3, and to report the measurements to base stations 120-1, 120-2, and 120-3. Based on measurement instructions 420, UE 110-1 may measure MBSFN reference symbols 440-1, and may report the measured MBSFN reference symbols 440-1 (e.g., as measurements 450-1) to base station 120-1. Base station 120-1 may provide measurements 450-1 to management node 140. UE 110-2 may measure MBSFN reference symbols 440-2, and may report the measured MBSFN reference symbols 440-2 (e.g., as measurements 450-2) to base station 120-2. Base station 120-2 may provide measurements 450-2 to management node 140. UE 110-3 may measure MBSFN reference symbols 440-3, and may report the measured MBSFN reference symbols 440-3 (e.g., as measurements 450-3) to base station 120-3. Base station 120-3 may provide measurements 450-3 to management node 140. Management node 140 may receive measurements 450-1, 450-2, and 450-3.

Returning to FIG. 8, process 800 may include determining signal strengths of the neighbor cells based on the measurement reports (block 850), and determining, based on the signal strengths, whether network coverage is sufficient when the selected cell(s) coverage is reduced or the selected cell(s) are out of service (block 860). For example, in embodiments described above in connection with FIG. 4, management node 140 may determine if measurements 450-1, 450-2, and 450-3 provide a sufficient number of measurements for reliable statistics. When management node 140 determines that a sufficient number of measurements for reliable statistics have been collected, management node 140 may determine potential cell coverage areas for various on/off combinations of cells, as indicated by reference number 460. In one example, management node 140 may determine signal strengths of neighbor cells (e.g., provided by one or more of base stations 120-1, 120-2, and 120-3) based on measurements 450-1, 450-2, and 450-3, and may determine whether network coverage would be sufficiently provided by the neighbor cells if one of base stations 120-1, 120-2, or 120-3 were turned off or lowered in power.

Figure 9:
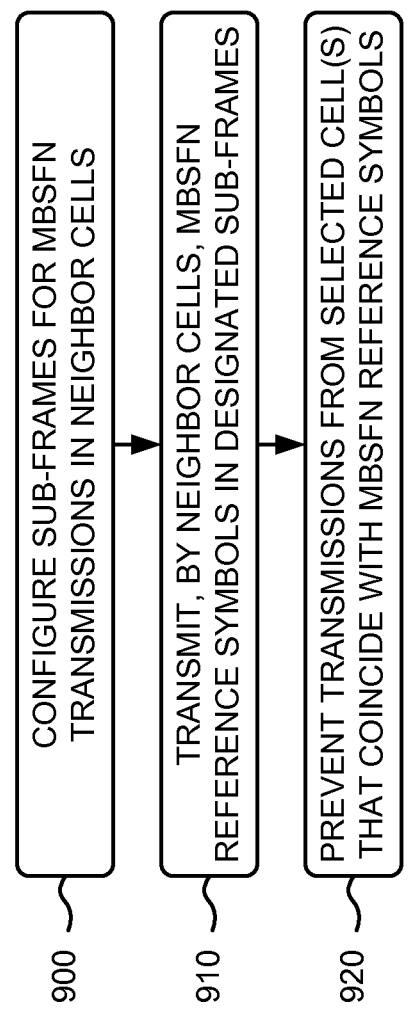

Process block 820 may include the process blocks depicted in FIG. 9. As illustrated in FIG. 9, process block 820 may include configuring sub-frames for MBSFN transmissions in the neighbor cells (block 900), transmitting, by the neighbor cells, MBSFN reference symbols in the designated sub-frames (block 910), and preventing transmissions from the selected cell(s) that coincide with the MBSFN reference symbols (block 920). For example, in embodiments described above in connection with FIG. 4, management node 140 may configure a MBSFN area (e.g., neighbor cells 130 which are to be measured) and may set up a MBSFN reference symbol muting schedule for the involved cells 130. Management node 140 may provide schedule information 410 to base stations 120-1, 120-2, and 120-3. Schedule information 410 may include information for configuring base stations 120-1, 120-2, and 120-3 with periodically occurring MBSFN sub-frames. In one example, schedule information 410 may provide a transmission pattern (e.g., for base stations 120-1, 120-2, and 120-3) that specifies when to transmit MBSFN reference symbols (e.g., without MBSFN data transmission) and when to mute transmission of MBSFN reference symbols. Based on schedule information 410, base station 120-1 may mute transmission of MBSFN reference symbols, as indicated by reference number 430-1, and base stations 120-2 and 120-3 may provide MBSFN reference symbols 440-1 to UE 110-1. MBSFN reference symbols 440-1 may be provided in MBSFN sub-frames that are used for measurement purposes (e.g., no actual MBSFN data may be transmitted in these sub-frames).

Figure 10:
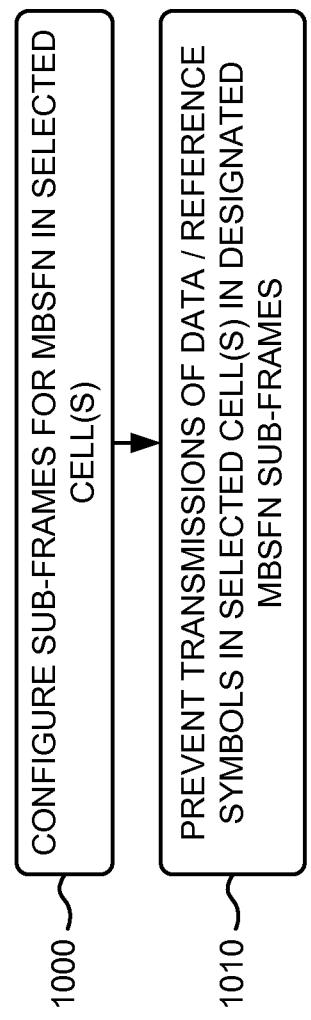

Alternatively, or additionally, process block 820 may include the process blocks depicted in FIG. 10. As illustrated in FIG. 10, process block 820 may include configuring sub-frames for MBSFN in the selected cell(s) (block 1000), and preventing transmissions of data and reference symbols in the selected cell(s) in the designated MBSFN sub-frames (block 1010). For example, in embodiments described above in connection with FIG. 5, management node 140 may configure an area (e.g., neighbor cells 130 which are to be measured) and may set up a regular reference symbol muting schedule for the involved cells 130. Management node 140 may provide schedule information 510 (e.g., a regular reference symbol muting schedule) to base stations 120-1, 120-2, and 120-3. In one example, schedule information 510 may include information for configuring base stations 120-1, 120-2, and 120-3 to mute (e.g., in turn) the transmission of both data symbols and reference symbols. In another example, schedule information 510 may include information for configuring base stations 120-1, 120-2, and 120-3 to mute (e.g., in turn) the transmission of data symbols. If both data symbols and reference symbols are to be muted, the sub-frames designated for muting may be configured as MBSFN sub-frames in the serving cell (e.g., in one of base stations 120-1, 120-2, or 120-3). If only data symbols are to be muted, the serving cell may mute transmission of all data symbols provided in designated sub-frames.

Alternatively, or additionally, process block 820 may include the process blocks depicted in FIG. 11. As illustrated in FIG. 11, process block 820 may include preventing transmission of data symbols in the selected cell(s) that coincide with transmission of reference symbols from the neighbor cells (block 1100), discontinuously transmitting synchronization signal(s) in the selected cell(s) (block 1110), or orthogonally positioning sub-frame offsets in the selected cell(s) and the neighbor cells (block 1120).

For example, in embodiments described above in connection with FIG. 5, management node 140 may provide schedule information 510 (e.g., a regular reference symbol muting schedule) to base stations 120-1, 120-2, and 120-3. In one example, schedule information 510 may include information for configuring base stations 120-1, 120-2, and 120-3 to mute (e.g., in turn) the transmission of data symbols. In another example, the serving cell may mute transmission of only those data symbols (e.g., provided in the designated sub-frames) that would collide with reference symbols provided by the neighbor cells.

In embodiments described above in connection with FIG. 6, management node 140 may configure an area (e.g., neighbor cells 130 which are to be measured) and may set up a SSS muting schedule for the involved cells 130. Management node 140 may provide schedule information 610 (e.g., a SSS muting schedule) to base stations 120-1, 120-2, and 120-3. In one example, schedule information 610 may include information for configuring base stations 120-1, 120-2, and 120-3 to mute (e.g., in turn) the transmission of SSSs. Though the SSS is a part of the physical layer, muting the SSS for short periods of time may not disturb ongoing activity in a serving cell. In one example, the time period for muting the SSS (e.g., in a serving cell) may be just long enough to evaluate the SSS based on link quality from neighbor cells.

In other embodiments, management node 140 (e.g., via schedule information, such as schedule information 410, 510, or 610) may orthogonally position sub-frame offsets in the serving cell and the neighbor cells so that transmissions of the serving cell do not interfere with reference signals transmitted by the neighbor cells.

Systems and/or methods described herein may allow user equipment to measure interference-free field strengths from selected cells in a single frequency network while the network operates in its regular mode. The systems and/or methods may assume that cells are aware of frame timing associated with neighbor cells (e.g., assuming that the network is synchronized) so that, via close cooperation with neighbor cells, a cell may mute its transmission when user equipment attached to the muted cell conduct measurements of the neighbor cells. The systems and/or methods may enable a network to test certain cell configurations without disturbing ongoing traffic in the network cells. In one example, the systems and/or methods may predict what would happen or what the network coverage would be if certain network cells were lowered in power or completely turned off.

The foregoing description of embodiments provides illustration and description, but is not intended to be exhaustive or to limit the invention to the precise form disclosed. Modifications and variations are possible in light of the above teachings or may be acquired from practice of the invention.

For example, the functions described above in connection with management node 140 may be implemented in one of base stations (e.g., one of base stations may act as a master and collect the information collected by management node 140). In another example, while series of blocks have been described with regard to FIGS. 8-11, the order of the blocks may be modified in other embodiments. Further, non-dependent blocks may be performed in parallel.

It should be emphasized that the term "comprises/comprising" when used in this specification is taken to specify the presence of stated features, integers, steps or components but does not preclude the presence or addition of one or more other features, integers, steps, components or groups thereof.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method in a network that includes a device, the method comprising:
   selecting, by the device, one or more cells in the network;
   coordinating, by the device, transmissions from the selected one or more cells, and transmissions from neighbor cells of the selected one or more cells, so that transmissions of the selected one or more cells do not interfere with reference signals transmitted by the neighbor cells at designated times;
   receiving, by the device and from a user equipment served by the selected one or more cells, measurement reports associated with the reference signals transmitted by the neighbor cells;
   determining, by the device, signal strengths of the neighbor cells based on the measurement reports; and
   predicting, by the device and based on the signal strengths, whether network coverage would be sufficient when coverage of the selected one or more cells is reduced by altering a power level of transmissions of data symbols from the selected one or more cells.

2. The method of claim 1, further comprising:
   grouping two or more of the neighbor cells into a neighbor cell group representing a Multicast-Broadcast Single Frequency Network (MBSFN) area; and configuring the user equipment to measure cell-specific reference symbols transmitted simultaneously by the two or more neighbor cells of the neighbor cell group at the designated times,
where the user equipment generates the measurement reports based on the measured cell-specific reference symbols.

3. The method of claim 1, further comprising:
configuring the user equipment to measure cell-specific reference symbols transmitted by the neighbor cells at the designated times,
where the user equipment generates the measurement reports based on the measured cell-specific reference symbols.

4. The method of claim 1, where coordinating transmissions from the selected one or more cells includes:
configuring sub-frames for Multicast-Broadcast Single Frequency Network (MBSFN) transmissions in the neighbor cells;
instructing the neighbor cells to transmit MBSFN reference symbols in designated sub-frames; and
preventing transmissions from the selected one or more cells that coincide with the transmitted MBSFN reference symbols,
where the user equipment generates the measurement reports based on the transmitted MBSFN reference symbols.

5. The method of claim 1, where coordinating transmissions from the selected one or more cells includes:
configuring Multicast-Broadcast Single Frequency Network (MBSFN) sub-frames in the selected one or more cells; and
preventing transmissions of data symbols and reference symbols in the selected one or more cells and in designated MBSFN sub-frames,
where the user equipment generates the measurement reports based on cell-specific reference symbols of the neighbor cells.

6. The method of claim 1, where coordinating transmissions from the selected one or more cells includes:
preventing transmission of data symbols in the selected one or more cells that coincide with transmission of cell-specific reference symbols from the neighbor cells.

7. The method of claim 1, where coordinating transmissions from the selected one or more cells includes:
instructing the selected one or more cells to discontinuously transmit a synchronization signal; and
instructing the user equipment to measure the synchronization signal of the neighbor cells at times of the instructed discontinuous transmission of the synchronization signal from the selected one or more cells.

8. The method of claim 1, where coordinating transmissions from the selected one or more cells includes:
arranging, orthogonally, positioning sub-frame offsets in the selected one or more cells and the neighbor cells; and
instructing the user equipment to measure a strength of positioning reference symbols transmitted by the neighbor cells.

9. The method of claim 1, further comprising:
configuring the user equipment with measurement windows that coincide with the reference signals transmitted by the neighbor cells at the designated times.

10. The method of claim 9, where the user equipment measures the reference signals transmitted by the neighbor cells in the measurement windows, and collects the measured reference signals transmitted by the neighbor cells in the measurement windows, and method further comprises:

receiving, from the user equipment, the collected reference signals transmitted by the neighbor cells in the measurement windows; and
processing the collected reference signals.

11. The method of claim 9, where the user equipment is configured with the measurement windows, measurement filtering parameters, and reporting criteria, and the method further comprises:
configuring the user equipment, via a Radio Resource Control (RRC) protocol, by providing a RRC Connection Reconfiguration message to the user equipment.

12. The method of claim 1, further comprising:
determining that a sufficient number of measurements for reliable statistics have been collected in the measurement reports.

13. A device in a network, the device comprising:
a memory to store a plurality of instructions; and
a processor to execute instructions in the memory to:
select one or more cells in the network,
coordinate transmissions from the selected one or more cells, and transmissions from neighbor cells of the selected one or more cells, so that transmissions of the selected one or more cells do not interfere with reference signals transmitted by the neighbor cells at designated times,
configure a user equipment, served by the selected one or more cells, to measure reference signals transmitted by the neighbor cells at the designated times, where the user equipment generates measurement reports based on the measured reference signals,
receive, from the user equipment, the measurement reports,
determine signal strengths of the neighbor cells based on the measurement reports, and
predicting, based on the signal strengths, whether network coverage would be sufficient when coverage of the selected one or more cells is reduced by altering a power level of transmissions of data symbols from the selected one or more.

14. The device of claim 13, where the device comprises a network management device provided in an operation supporting system (OSS).

15. The device of claim 13, where the network comprises a Long Term Evolution (LTE)-based network.

16. The device of claim 13, where, when coordinating transmissions from the selected one or more cells, the processor is further to execute instructions in the memory to:
configure sub-frames for Multicast-Broadcast Single Frequency Network (MBSFN) transmissions in the neighbor cells,
instruct the neighbor cells to transmit MBSFN reference symbols in designated sub-frames, and
prevent transmissions from the selected one or more cells that coincide with the transmitted MBSFN reference symbols.

17. The device of claim 13, where, when coordinating transmissions from the selected one or more cells, the processor is further to execute instructions in the memory to:
configure Multimedia Broadcast/Multicast Service (MBSFN) sub-frames in the selected one or more cells, and
prevent transmissions of data symbols and reference symbols in the selected one or more cells and in designated MBSFN sub-frames.

18. The device of claim 13, where, when coordinating transmissions from the selected one or more cells, the processor is further to execute instructions in the memory to:

prevent transmission of data symbols in the selected one or more cells that coincide with transmission of reference symbols from the neighbor cells.

19. The device of claim 13, where, when coordinating transmissions from the selected one or more cells, the processor is further to execute instructions in the memory to:
instruct the selected one or more cells to discontinuously transmit a synchronization signal; and
instruct the user equipment to measure the synchronization signal of the neighbor cells at times of the instructed discontinuous transmission of the synchronization signal from the selected one or more cells.

20. The device of claim 13, where, when coordinating transmissions from the selected one or more cells, the processor is further to execute instructions in the memory to:
arrange, orthogonally, positioning sub-frame offsets in the selected one or more cells and the neighbor cells.

21. The device of claim 20, where strengths of positioning reference symbols from different neighbor cells are measured to infer network coverage for the user equipment.

22. The device of claim 13, where the user equipment is configured with measurement windows that coincide with the reference signals transmitted by the neighbor cells at the designated times.

23. The device of claim 22, where the user equipment measures the reference signals transmitted by the neighbor cells in the measurement windows, and collects the measured reference signals transmitted by the neighbor cells in the measurement windows, and the processor is further to execute instructions in the memory to:
receive the collected reference signals transmitted by the neighbor cells in the measurement windows, and
process the collected reference signals.

24. The device of claim 22, where the user equipment is configured with the measurement windows, measurement filtering parameters, and reporting criteria.

25. A system in a network, the system comprising:
means for selecting one or more cells in the network;
means for coordinating transmissions from the selected one or more cells, and transmissions from neighbor cells of the selected one or more cells, so that transmissions of the selected one or more cells do not interfere with reference signals transmitted by the neighbor cells at designated times;
means for configuring a user equipment, served by the selected one or more cells, to measure reference signals transmitted by the neighbor cells at the designated times, where the user equipment generates measurement reports based on the measured reference signals;
means for receiving, from the user equipment, the measurement reports;
means for configuring the user equipment with measurement windows that coincide with the reference signals transmitted by the neighbor cells at the designated times, where the user equipment measures the reference signals transmitted by the neighbor cells in the measurement windows, and collects the measured reference signals transmitted by the neighbor cells in the measurement windows;
means for receiving, from the user equipment and separately from other mobility measurement reports, the collected reference signals transmitted by the neighbor cells in the measurement windows;
means for determining signal strengths of the neighbor cells based on the measurement reports and based on the collected reference signals transmitted by the neighbor cells in the measurement windows; and
means for predicting, based on the signal strengths, whether network coverage would be sufficient when coverage of the selected one or more cells is reduced by altering a power level of transmissions of data symbols from the selected one or more cells.

26. The method of claim 1, wherein the determining whether network coverage is sufficient comprises determining whether the selected one or more cells receives a strong, interference-free, highly-diversified signal from the neighbor cells.

27. The method of claim 1, further comprising:
determining potential network coverage areas for on/off combinations of the neighbor cells.

28. The method of claim 1, further comprising:
muting at least one of the selected one or more cells in response to network coverage by the neighbor cells being determined to be sufficient while coverage of the at least one of the selected one or more cells is off.

29. The method of claim 28, wherein the muting comprises muting different ones of the selected one or more cells on a schedule.

30. The method of claim 1, further comprising:
muting at least one of the selected one or more cells that receives interfering signals from the neighbor cells in response to network coverage by the neighbor cells being determined to be sufficient while coverage of the at least one of the selected one or more cells is off.

\* \* \* \* \*

UNITED STATES PATENT AND TRADEMARK OFFICE
CERTIFICATE OF CORRECTION

PATENT NO.        : 8,694,043 B2                              Page 1 of 1
APPLICATION NO.   : 12/762572
DATED             : April 8, 2014
INVENTOR(S)       : Rácz et al.

It is certified that error appears in the above-identified patent and that said Letters Patent is hereby corrected as shown below:

In the Claims

In Column 20, Line 40, in Claim 13, delete "one or more." and insert -- one or more cells. --, therefor.

Signed and Sealed this
Second Day of September, 2014

Michelle K. Lee
*Deputy Director of the United States Patent and Trademark Office*